(12) United States Patent
An et al.

(10) Patent No.: US 10,137,791 B2
(45) Date of Patent: Nov. 27, 2018

(54) METHOD AND SYSTEM FOR CONTROLLING VEHICLE CONVERTER

(71) Applicant: Hyundai Motor Company, Seoul (KR)

(72) Inventors: Jun Mo An, Gyeonggi-Do (KR); Su Hyun Bae, Daegu (KR); Sung Kyu Kim, Gyeonggi-Do (KR); Joo Young Park, Yongin-Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 140 days.

(21) Appl. No.: 15/229,330

(22) Filed: Aug. 5, 2016

(65) Prior Publication Data
US 2017/0297439 A1 Oct. 19, 2017

(30) Foreign Application Priority Data
Apr. 18, 2016 (KR) .......................... 10-2016-0046836

(51) Int. Cl.
*B60L 11/18* (2006.01)
*B60W 10/06* (2006.01)
(Continued)

(52) U.S. Cl.
CPC .............. *B60L 11/1811* (2013.01); *B60K 6/26* (2013.01); *B60L 11/1868* (2013.01); *B60L 15/20* (2013.01);
(Continued)

(58) Field of Classification Search
CPC .......... B60L 11/1811; B60K 6/26; H02P 6/04; H02P 6/08; H02P 27/06; B60W 10/26
(Continued)

(56) References Cited

U.S. PATENT DOCUMENTS

2009/0118079 A1* 5/2009 Heap ........................ B60K 6/26
477/3
2010/0079111 A1* 4/2010 Masuda .............. H01M 10/486
320/134
(Continued)

FOREIGN PATENT DOCUMENTS

JP H11041986 A 2/1999
JP 2009-201200 A 9/2009
(Continued)

OTHER PUBLICATIONS

Okamura, M. et al, "Development of Hybrid Electric Drive System Using a Boost Converter", Toyota Motor Corporation, 12 pages.

*Primary Examiner* — Brandon S Cole
(74) *Attorney, Agent, or Firm* — Mintz Levin Cohn Ferris Glovsky and Popeo, P.C.; Peter F. Corless

(57) ABSTRACT

A method for controlling a vehicle converter includes: acquiring, by a controller, required maximum voltages and required minimum voltages of a first motor and a second motor using required torque and a rotation speed of the first motor and the second motor; acquiring voltage commands of the first motor and the second motor using the rotation speed and a magnetic flux of the first motor and the second motor; acquiring a corrected voltage command using the voltage commands of the first motor and the second motor; acquiring an output voltage command of the converter using the required maximum voltage and the required minimum voltage of the first motor and the second motor, the corrected voltage command, and a voltage of a battery; and controlling an output voltage of the converter using the output voltage command.

9 Claims, 3 Drawing Sheets

(51) Int. Cl.
  *B60W 10/08*  (2006.01)
  *H02P 6/08*   (2016.01)
  *B60W 10/26*  (2006.01)
  *H02J 7/00*   (2006.01)
  *B60K 6/365*  (2007.10)
  *H02P 6/34*   (2016.01)
  *B60K 6/26*   (2007.10)
  *H02P 6/04*   (2016.01)
  *B60L 15/20*  (2006.01)

(52) U.S. Cl.
  CPC ............... *H02P 6/04* (2013.01); *H02P 6/34* (2016.02); *Y02T 10/7258* (2013.01)

(58) Field of Classification Search
  USPC .................................................. 307/9.1–10.8
  See application file for complete search history.

(56) References Cited

U.S. PATENT DOCUMENTS

| | | | | |
|---|---|---|---|---|
| 2010/0179714 A1* | 7/2010 | Tani | ............... | B60K 6/365 701/22 |
| 2012/0139458 A1* | 6/2012 | Yoo | ............... | B60L 3/003 318/400.01 |
| 2014/0139156 A1* | 5/2014 | Hayashi | ............... | H02P 21/02 318/400.3 |
| 2015/0251541 A1* | 9/2015 | Drako | ............... | B60L 3/106 701/22 |
| 2015/0349679 A1* | 12/2015 | Rogers | ............... | H02P 6/08 318/400.3 |

FOREIGN PATENT DOCUMENTS

| | | |
|---|---|---|
| JP | 2010-130770 | 6/2010 |
| JP | 2013-099042 A | 5/2013 |
| KR | 10-0693505 | 3/2007 |
| KR | 10-2009-0015151 A | 2/2009 |
| KR | 10-2013-0063893 A | 6/2013 |
| KR | 10-1283892 B1 | 7/2013 |
| KR | 10-2014-0140863 | 12/2014 |
| WO | 2009/084358 A1 | 7/2009 |
| WO | 2009-084359 A1 | 7/2009 |

* cited by examiner

METHOD AND SYSTEM FOR CONTROLLING VEHICLE CONVERTER

CROSS REFERENCE TO RELATED APPLICATION

The present application claims under 35 U.S.C. § 119(a) the benefit of Korean Patent Application No. 10-2016-0046836, filed on Apr. 18, 2016 in the Korean Intellectual Property Office, the entire contents of which are incorporated by reference herein.

BACKGROUND

(a) Field of the Invention

The present invention relates to a method and system for controlling a vehicle converter, more particularly, to a method and system which may improve the fuel efficiency of a vehicle by suitably controlling the output voltage of the vehicle converter and increase durability by reducing the generation of heat in a power conversion device.

(b) Description of the Related Art

Recently, with increased interest in eco-friendly vehicles, hybrid vehicles, which utilize both an engine and an electric motor as power sources, have come to be widely used. Hybrid vehicles have a high-voltage battery for an electric motor and a low-voltage battery for an engine and electrical components.

Because hybrid vehicles typically do not have an alternator for charging the low-voltage battery, an isolated step-down DC-DC converter, which uses the high-voltage battery as an input power source in order to charge the low-voltage battery or to supply power to electric components, is necessary. Also, because power consumption increases with the increase in the number of electric components installed in a vehicle, a DC-DC converter must be designed to enable conversion of a large amount of power.

However, such a DC-DC converter has a problem in that the amount of heat generated as a result of power loss increases. Also, an increase in the size and weight of a cooling device, which is added in order to solve this problem, may cause an increase in the weight of the vehicle. Accordingly, in order not only to improve power conversion efficiency but also to reduce the weight of a cooling device by reducing the amount of heat that is generated, it is necessary to reduce loss in the DC-DC converter.

Meanwhile, various techniques have been developed in order to improve the efficiency of a converter, but most such techniques aim to improve only the efficiency of the converter, rather than considering the entire power system of the vehicle in which the converter is applied. Accordingly, the efficiency of the converter is improved but loss in another power system, connected to the converter, may increase, and thus the total power loss in the vehicle may increase.

The foregoing is intended merely to aid in the understanding of the background of the present invention, and is not intended to mean that the present invention falls within the purview of the related art that is already known to those skilled in the art.

SUMMARY

Accordingly, the present invention provides a method and system for controlling a vehicle converter, which may minimize power loss in a vehicle power conversion system by acquiring the output voltage of the converter using a voltage command of each motor arranged in a vehicle.

In order to achieve the above object, a method for controlling a vehicle converter according to the present invention includes: acquiring, by a controller, a required maximum voltage and a required minimum voltage of a first motor and a second motor using a required torque and a rotation speed of the first motor and the second motor, acquiring, by the controller, voltage commands of the first motor and the second motor using the rotation speed and a magnetic flux of the first motor and the second motor, acquiring, by the controller, a corrected voltage command using the voltage commands of the first motor and the second motor, acquiring, by the controller, an output voltage command of the converter using the required maximum voltage and the required minimum voltage of the first motor and the second motor, the corrected voltage command, and a voltage of a battery; and controlling, by the controller, an output voltage of the converter using the output voltage command of the converter.

Acquiring the required maximum voltage and the required minimum voltage may be configured to derive the required maximum voltage of the first motor and the second motor from map data, an input of which is a product of the required torque and the rotation speed, and an output of which is the required maximum voltage, and to derive the required minimum voltage of the first motor and the second motor from map data, an input of which is a product of the required torque and the rotation speed, and an output of which is the required minimum voltage.

Acquiring the voltage commands may be configured to acquire the voltage commands using following equations:

$$V_{c1}=k_{MG1}*f_{MG1}, k_{MG1}=k_1*w_{MG1}$$

$$V_{c2}=k_{MG2}*f_{MG2}, k_{MG2}=k_2*w_{MG2}$$

wherein $V_{c1}$ denotes the voltage command of the first motor, $k_{MG1}$ denotes a conversion constant of the first motor, $f_{MG1}$ denotes the magnetic flux of the first motor, $k_1$ denotes a rotation speed constant of the first motor, $w_{MG1}$ denotes the rotation speed of the first motor, $V_{c2}$ denotes the voltage command of the second motor, $k_{MG2}$ denotes a conversion constant of the second motor, $f_{MG2}$ denotes the magnetic flux of the second motor, $k_2$ denotes a rotation speed constant of the second motor, and $w_{MG2}$ denotes the rotation speed of the second motor.

Acquiring the corrected voltage command may include determining, by the controller, a greater voltage command by comparing the voltage command of the first motor with the voltage command of the second motor, calculating, by the controller, a difference between the voltage command of the first motor and the voltage command of the second motor; deriving, by the controller, a correction value from map data, an input of which is the difference between the voltage command of the first motor and the voltage command of the second motor, and an output of which is the correction value; and acquiring, by the controller, the corrected voltage command by subtracting the correction value from the greater voltage command.

The correction value may increase as the difference between the voltage command of the first motor and the voltage command of the second motor increases.

Acquiring the output voltage command of the converter may include acquiring, by the controller, a maximum voltage limit value using the required maximum voltage of the first motor and the required maximum voltage of the second motor, acquiring, by the controller, a minimum voltage limit value using the required minimum voltage of the first motor, the required minimum voltage of the second motor, and the voltage of the battery; and acquiring, by the controller, the output voltage command of the converter by applying the corrected voltage command to a limiter, a maximum value of which is the maximum voltage limit value and a minimum value of which is the minimum voltage limit value.

Acquiring the maximum voltage limit value may include comparing, by the controller, the required maximum voltage of the first motor with the required maximum voltage of the second motor, and setting, by the controller, the required maximum voltage of the first motor as the maximum voltage limit value when the required maximum voltage of the first motor is greater than the required maximum voltage of the second motor, or setting, by the controller, the required maximum voltage of the second motor as the maximum voltage limit value when the required maximum voltage of the first motor is equal to or less than the required maximum voltage of the second motor.

Acquiring the minimum voltage limit value may include comparing, by the controller, the required minimum voltage of the first motor with the required minimum voltage of the second motor, setting, by the controller, the required minimum voltage of the first motor as a minimum voltage comparison value when the required minimum voltage of the first motor is less than the required minimum voltage of the second motor, or setting, by the controller, the required minimum voltage of the second motor as the minimum voltage comparison value when the required minimum voltage of the first motor is equal to or greater than the required minimum voltage of the second motor, comparing, by the controller, the minimum voltage comparison value with the voltage of the battery; and setting, by the controller, the minimum voltage comparison value as the minimum voltage limit value when the minimum voltage comparison value is less than the voltage of the battery, or setting, by the controller, the voltage of the battery as the minimum voltage limit value when the minimum voltage comparison value is equal to or greater than the voltage of the battery.

Acquiring the output voltage command of the converter by applying the corrected voltage command may be configured such that the controller sets the maximum voltage limit value as the output voltage command of the converter when the corrected voltage command is greater than the maximum voltage limit value, sets the minimum voltage limit value as the output voltage command of the converter when the corrected voltage command is less than the minimum voltage limit value, and sets the corrected voltage command as the output voltage command of the converter when the corrected voltage command is equal to or less than the maximum voltage limit value and equal to or greater than the minimum voltage limit value.

A system for controlling a vehicle converter according to the present invention includes first and second motors, which are drive motors; a rechargeable battery; a converter arranged between the battery and the first motor and the second motor, and a controller for acquiring a required maximum voltage and a required minimum voltage of the first motor and the second motor using a required torque and a rotation speed of the first motor and the second motor, acquiring voltage commands of the first motor and the second motor using the rotation speed and a magnetic flux of the first motor and the second motor, acquiring a corrected voltage command using the voltage commands of the first motor and the second motor, acquiring an output voltage command of the converter using the required maximum voltage and the required minimum voltage of the first motor and the second motor, the corrected voltage command, and a voltage of the battery, and controlling an output voltage of the converter using the output voltage command of the converter.

The corrected voltage command may be acquired such that the controller determines a greater voltage command by comparing the voltage command of the first motor with the voltage command of the second motor, calculates a difference between the voltage command of the first motor and the voltage command of the second motor, derives a correction value using map data, an input of which is the difference between the voltage command of the first motor and the voltage command of the second motor and an output of which is the correction value, and acquires the corrected voltage command by subtracting the correction value from the greater voltage command.

The output voltage command of the converter may be acquired such that the controller acquires a maximum voltage limit value using the required maximum voltage of the first motor and the required maximum voltage of the second motor, acquires a minimum voltage limit value using the required minimum voltage of the first motor, the required minimum voltage of the second motor, and the voltage of the battery, and applies the corrected voltage command to a limiter, a maximum value of which is the maximum voltage limit value and a minimum value of which is the minimum voltage limit value.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a preferred embodiment of the present invention will be described with reference to the accompanying drawings.

Figure 1:
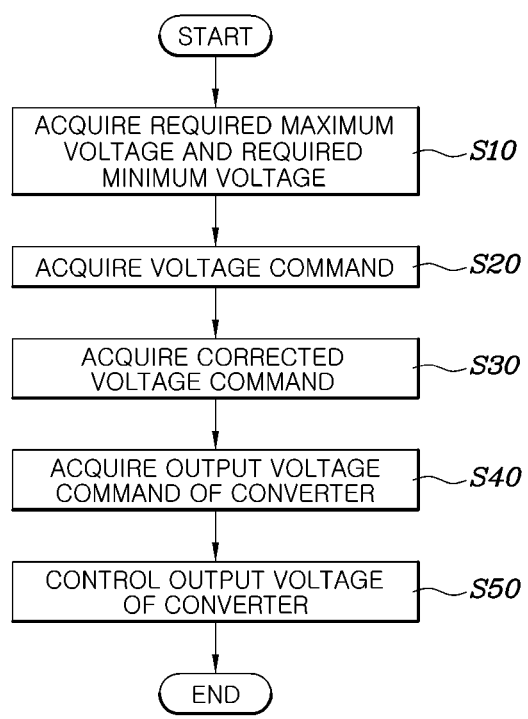
FIG. 1 is a flowchart of a method for controlling a vehicle converter according to an embodiment of the present invention.

As illustrated in FIG. 1, a method for controlling a vehicle converter 40 according to the present invention includes: acquiring, by a controller 50, required maximum voltages and required minimum voltages of a first motor 10 and a second motor 20 using a required torque and the rotation speed of the first motor 10 and the second motor 20 (S10); acquiring, by the controller 50, voltage commands of the first motor 10 and the second motor 20 using the rotation speed and magnetic flux of the first motor 10 and the second motor 20 (S20); acquiring, by the controller 50, a corrected voltage command using the voltage commands of the first motor 10 and the second motor 20 (S30); acquiring, by the controller 50, an output voltage command of a converter using the required maximum voltages and the required minimum voltages of the first motor 10 and the second motor 20, the corrected voltage command, and the voltage of a battery 30 (S40); and controlling, by the controller 50, the output voltage of the converter using the output voltage command of the converter 40 (S50).

In the present invention, the first motor 10 and the second motor 20 are motors arranged in a vehicle, and may respectively represent a motor arranged on a front wheel side and a motor arranged on a rear wheel side in the case of a four-wheel-drive vehicle. The present invention acquires the voltage command of the first motor 10 and the voltage command of the second motor 20 and then determines the output voltage of the converter 40 by comparing the two voltage commands. Therefore, as needed, a designer who implements the present invention may freely set either the motor arranged on the front wheel side or the motor arranged on the rear wheel side as the first motor 10.

After the first motor 10 and the second motor 20 are distinguished from each other, a step of acquiring a required maximum voltage and a required minimum voltage (S10) is performed as the first step for implementing the present invention, as illustrated in FIG. 1. The required maximum voltage and the required minimum voltage are derived from map data. Specifically, the required maximum voltage is derived from map data, the input of which is the product of required torque and a rotation speed, and the output of which is the required maximum voltage. Also, the required minimum voltage is derived from map data, the input of which is the product of required torque and a rotation speed, and the output of which is the required minimum voltage. Here, because the value of the required torque and the rotation speed is the value of power output by the rotation of a motor, it is possible to use map data, the input of which is the output power of the first motor 10 and the second motor 20, and the output of which is the required maximum voltage or the required minimum voltage.

When the required maximum voltages and the required minimum voltages of the first motor 10 and the second motor 20 are acquired through the above-mentioned method, it is necessary to acquire the output voltage command of the converter 40. However, because the present invention intends to improve the efficiency of the vehicle power conversion system by acquiring a corrected voltage command using the difference between the voltage commands of the first motor 10 and the second motor 20 and then applying the corrected voltage command to the output voltage command of the converter 40, the step of acquiring the voltage commands of the first motor 10 and the second motor 20 is additionally performed as the first step for acquiring the corrected voltage command. As used herein, the voltage command refers to the value of voltage to be applied to the first motor 10 or the second motor 20 in order to rotate the first motor 10 or the second motor 20 at a desired speed. Specifically, the voltage command may be acquired using the following equation:

$$V_{c1} = k_{MG1} * f_{MG1}, k_{MG1} = k_1 * w_{MG1}$$

$$V_{c2} = k_{MG2} * f_{MG2}, k_{MG2} = k_2 * w_{MG2}$$

Here, $V_{c1}$ denotes the voltage command of the first motor 10, $k_{MG1}$ denotes the conversion constant of the first motor 10, $f_{MG1}$ denotes the magnetic flux of the first motor 10, $k_1$ denotes the rotation speed constant of the first motor 10, $w_{MG1}$ denotes the rotation speed of the first motor 10, $V_2$ denotes the voltage command of the second motor 20, $k_{MG2}$ denotes the conversion constant of the second motor 20, $f_{MG2}$ denotes the magnetic flux of the second motor 20, $k_2$ denotes the rotation speed constant of the second motor 20, and $w_{MG2}$ denotes the rotation speed of the second motor 20.

Here, because the conversion constant of the first motor 10, the conversion constant of the second motor 20, the rotation speed constant of the first motor 10, and the rotation speed constant of the second motor 20 correspond to the characteristic values of the first motor 10 and the second motor 20, these values may vary depending on the method of designing the first motor 10 and second motor 20.

When the voltage command of the first motor 10 and the voltage command of the second motor 20 are acquired through the step of acquiring the voltage commands (S20), the step of acquiring a corrected voltage command using the acquired voltage commands (S30) is performed as described above. The processes performed in the step of acquiring the corrected voltage command (S30) are specifically illustrated in the flowchart of FIG. 2.

Figure 2:
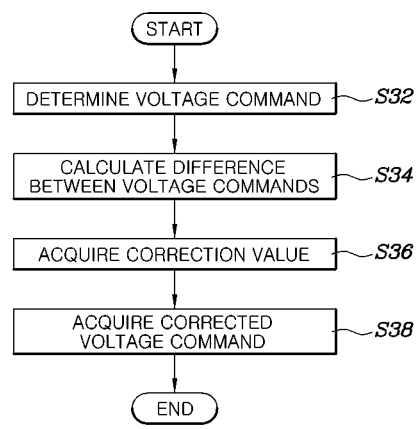
FIG. 2 is a flowchart of a step for acquiring a corrected voltage command according to an embodiment of the present invention.
Figure 3:
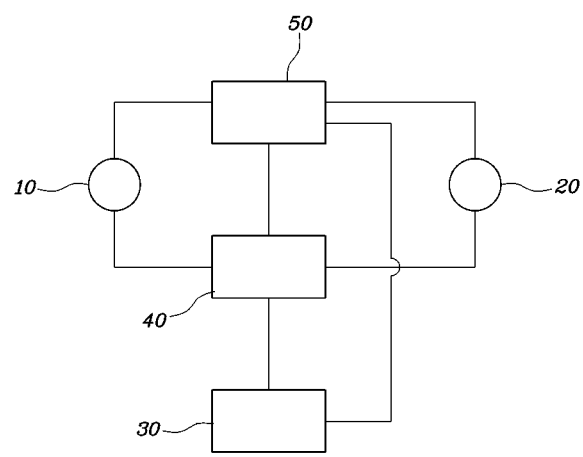
FIG. 3 is a block diagram of a system for controlling a vehicle converter according to an embodiment of the present invention.

As shown in FIG. 2, the step of acquiring the corrected voltage command (S30) includes determining, by the controller 50, the greater voltage command of the voltage command of the first motor 10 and the voltage command of the second motor 20 by comparing the two voltage commands (S32); calculating, by the controller 50, the difference between the voltage command of the first motor 10 and the voltage command of the second motor 20 (S34); deriving, by the controller 50, a correction value from map data, the input of which is the difference between the two voltage commands and the output of which is the correction value (S36); and acquiring, by the controller 50, the corrected voltage command by subtracting the correction value from the greater voltage command (S38).

Consequently, the corrected voltage command is acquired by subtracting the correction value, derived from the map data, from the greater voltage command of the voltage command of the first motor 10 and the voltage command of the second motor 20. Here, the greater the difference between the voltage commands of the first motor 10 and second motor 20, the higher the correction value may be.

When the corrected voltage command is acquired through the above-mentioned step, it is necessary to acquire the output voltage command of the converter 40, which the present invention ultimately aims to acquire. Basically, the output voltage command of the converter 40 may be acquired using the required maximum voltage and required minimum voltage of the first motor 10 and second motor 20, the corrected voltage command, and the voltage of the battery 30, as described above.

Specifically, first, the controller 50 acquires a maximum voltage limit value using the required maximum voltage of the first motor 10 and the required maximum voltage of the second motor 20. Here, the maximum voltage limit value may be acquired through the step of comparing the required maximum voltage of the first motor 10 with that of the second motor 20 and the step in which the required maximum voltage of the first motor 10 is set as the maximum voltage limit value if the required maximum voltage of the first motor 10 is greater than that of the second motor 20 or in which the required maximum voltage of the second motor 20 is set as the maximum voltage limit value if the required maximum voltage of the first motor 10 is equal to or less than that of the second motor 20. In other words, the greater value of the required maximum voltage of the first motor 10 and the required maximum voltage of the second motor 20 is set as the maximum voltage limit value.

After the maximum voltage limit value is acquired, the controller 50 acquires a minimum voltage limit value using the required minimum voltage of the first motor 10, the required minimum voltage of the second motor 20, and the voltage of the battery 30. Specifically, the minimum voltage limit value may be acquired through the step of comparing the required minimum voltage of the first motor 10 with that of the second motor 20, the step in which the required minimum voltage of the first motor 10 is set as a minimum voltage comparison value if the required minimum voltage of the first motor 10 is less than that of the second motor 20 or in which the required minimum voltage of the second motor 20 is set as the minimum voltage comparison value if the required minimum voltage of the first motor 10 is equal to or greater than that of the second motor 20, the step of comparing the minimum voltage comparison value with the voltage of the battery 30, and the step in which the minimum voltage comparison value is set as the minimum voltage limit value if the minimum voltage comparison value is less than the voltage of the battery 30 or in which the voltage of the battery 30 is set as the minimum voltage limit value if the minimum voltage comparison value is equal to or greater than the voltage of the battery 30.

The present invention describes the method in which the maximum voltage limit value is acquired first and then the minimum voltage limit value is acquired. However, as needed, a designer may freely change the order in which the maximum voltage limit value and the minimum voltage limit value are acquired.

After the maximum voltage limit value and the minimum voltage limit value are acquired, the controller 50 acquires the output voltage command of the converter 40 by applying the corrected voltage command to a limiter, the maximum value of which is the maximum voltage limit value, and the minimum value of which is the minimum voltage limit value.

In other words, if the corrected voltage command is greater than the maximum voltage limit value, the maximum voltage limit value is set as the output voltage command of the converter 40. If the corrected voltage command is less than the minimum voltage limit value, the minimum voltage limit value is set as the output voltage command of the converter 40. If the corrected voltage command is equal to or less than the maximum voltage limit value and is equal to or greater than the minimum voltage limit value, the corrected voltage command is set as the output voltage command of the converter 40.

Finally, because the output voltage of the converter 40 is controlled using the acquired output voltage command of the converter 40 in the step of controlling the output voltage of the converter (S50), the output voltage of the converter 40 may be controlled in consideration of the loss of the motor, whereby the fuel efficiency of the vehicle is improved compared to when the conventional method for controlling the converter 40 is used, and the amount of heat generated in the vehicle power conversion device may be reduced.

Additionally, a system for controlling a vehicle converter 40 according to the present invention includes a first motor 10, which is a vehicle drive motor, a second motor 20, which is a vehicle drive motor, a rechargeable battery 30; a converter 40, arranged between the battery 30, the first motor 10 and the second motor 20; and a controller 50 for acquiring the required maximum voltages and the required minimum voltages of the first motor 10 and the second motor 20 using the required torque and the rotation speed of the first motor 10 and the second motor 20, acquiring voltage commands of the first motor 10 and the second motor 20 using the rotation speed and magnetic flux of the first motor 10 and the second motor 20, acquiring a corrected voltage command using the voltage commands of the first motor 10 and the second motor 20, acquiring the output voltage command of the converter 40 using the required maximum voltage and the required minimum voltage of the first motor 10 and the second motor 20, the corrected voltage command, and the voltage of the battery 30, and controlling the output voltage of the converter 40 using the output voltage command of the converter 40.

According to the present invention, heat generated in a vehicle power conversion system may be reduced by reducing power loss therein, whereby the cooling performance of the vehicle power conversion system is improved. Also, as the energy efficiency of the system is improved, not only the fuel efficiency of the vehicle but also the durability of the power conversion system may be improved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A method for controlling a vehicle converter, comprising the steps of:

acquiring, by a controller, a required maximum voltage and a required minimum voltage of a first motor and a second motor using a required torque and a rotation speed of the first motor and the second motor;

acquiring, by the controller, voltage commands of the first motor and the second motor using the rotation speed and a magnetic flux of the first motor and the second motor;

acquiring, by the controller, a corrected voltage command using the voltage commands of the first motor and the second motor;

acquiring, by the controller, an output voltage command of the converter using the required maximum voltage and the required minimum voltage of the first motor and the second motor, the corrected voltage command, and a voltage of a battery; and controlling, by the controller, an output voltage of the converter using the output voltage command of the converter, wherein the step of acquiring the required maximum voltage and the required minimum voltage further comprises the steps of:
deriving the required maximum voltage of the first motor and the second motor from map data, an input of which is a product of the required torque and the rotation speed, and an output of which is the required maximum voltage; and
deriving the required minimum voltage of the first motor and the second motor from map data, an input of which is a product of the required torque and the rotation speed, and an output of which is the required minimum voltage, and wherein the step of acquiring the corrected voltage command further comprises the steps of:
determining, by the controller, a greater voltage command by comparing the voltage command of the first motor with the voltage command of the second motor;
calculating, by the controller, a difference between the voltage command of the first motor and the voltage command of the second motor;
deriving, by the controller, a correction value from map data, an input of which is the difference between the voltage command of the first motor and the voltage command of the second motor, and an output of which is the correction value; and
acquiring, by the controller, the corrected voltage command by subtracting the correction value from the greater voltage command.

2. The method of claim 1, wherein the step of acquiring the voltage commands includes acquiring the voltage commands using following equations:

$$V_{c1}=k_{MG1}*f_{MG1}, k_{MG1}=k_1*w_{MG1}$$

$$V_{c2}=k_{MG2}*f_{MG2}, k_{MG2}=k_2*w_{MG2}$$

wherein $V_{c1}$ denotes the voltage command of the first motor, $k_{MG1}$ denotes a conversion constant of the first motor, $f_{MG1}$ denotes the magnetic flux of the first motor, $k_1$ denotes a rotation speed constant of the first motor, $w_{MG1}$ denotes the rotation speed of the first motor, $V_{c2}$ denotes the voltage command of the second motor, $k_{MG2}$ denotes a conversion constant of the second motor, $f_{MG2}$ denotes the magnetic flux of the second motor, $k_2$ denotes a rotation speed constant of the second motor, and $w_{MG2}$ denotes the rotation speed of the second motor.

3. The method of claim 1, wherein the correction value increases as the difference between the voltage command of the first motor and the voltage command of the second motor increases.

4. The method of claim 1, wherein the step of acquiring the output voltage command of the converter further comprises the steps of:
acquiring, by the controller, a maximum voltage limit value using the required maximum voltage of the first motor and the required maximum voltage of the second motor;
acquiring, by the controller, a minimum voltage limit value using the required minimum voltage of the first motor, the required minimum voltage of the second motor, and the voltage of the battery; and
acquiring, by the controller, the output voltage command of the converter by applying the corrected voltage command to a limiter, a maximum value of which is the maximum voltage limit value, and a minimum value of which is the minimum voltage limit value.

5. The method of claim 4, wherein step of acquiring the maximum voltage limit value further comprises the steps of:
comparing, by the controller, the required maximum voltage of the first motor with the required maximum voltage of the second motor; and
setting, by the controller, the required maximum voltage of the first motor as the maximum voltage limit value when the required maximum voltage of the first motor is greater than the required maximum voltage of the second motor, and setting, by the controller, the required maximum voltage of the second motor as the maximum voltage limit value when the required maximum voltage of the first motor is equal to or less than the required maximum voltage of the second motor.

6. The method of claim 5, wherein the step of acquiring the minimum voltage limit value further comprises the steps of:
comparing, by the controller, the required minimum voltage of the first motor with the required minimum voltage of the second motor;
setting, by the controller, the required minimum voltage of the first motor as a minimum voltage comparison value when the required minimum voltage of the first motor is less than the required minimum voltage of the second motor, and setting, by the controller, the required minimum voltage of the second motor as the minimum voltage comparison value when the required minimum voltage of the first motor is equal to or greater than the required minimum voltage of the second motor;
comparing, by the controller, the minimum voltage comparison value with the voltage of the battery; and
setting, by the controller, the minimum voltage comparison value as the minimum voltage limit value when the minimum voltage comparison value is less than the voltage of the battery, and setting, by the controller, the voltage of the battery as the minimum voltage limit value when the minimum voltage comparison value is equal to or greater than the voltage of the battery.

7. The method of claim 4, wherein the step of acquiring the output voltage command of the converter by applying the corrected voltage command is carried out such that the controller sets the maximum voltage limit value as the output voltage command of the converter when the corrected voltage command is greater than the maximum voltage limit value, sets the minimum voltage limit value as the output voltage command of the converter when the corrected voltage command is less than the minimum voltage limit value, and sets the corrected voltage command as the output voltage command of the converter when the corrected voltage command is equal to or less than the maximum voltage limit value and equal to or greater than the minimum voltage limit value.

8. A system for controlling a vehicle converter, comprising:
- a first motor;
- a second motor, the first and second motors being vehicle drive motors;
- a rechargeable battery;
- a converter arranged between the battery and the first motor and the second motor; and
- a controller for acquiring a required maximum voltage and a required minimum voltage of the first motor and the second motor using a required torque and a rotation speed of the first motor and the second motor, acquiring voltage commands of the first motor and the second motor using the rotation speed and a magnetic flux of the first motor and the second motor, acquiring a corrected voltage command using the voltage commands of the first motor and the second motor, acquiring an output voltage command of the converter using the required maximum voltage and the required minimum voltage of the first motor and the second motor, the corrected voltage command, and a voltage of the battery, and controlling an output voltage of the converter using the output voltage command of the converter, wherein the corrected voltage command is acquired such that the controller determines a greater voltage command by comparing the voltage command of the first motor with the voltage command of the second motor, calculates a difference between the voltage command of the first motor and the voltage command of the second motor, derives a correction value using map data, an input of which is the difference between the voltage command of the first motor and the voltage command of the second motor and an output of which is the correction value, and acquires the corrected voltage command by subtracting the correction value from the greater voltage command.

9. The system of claim 8, wherein the output voltage command of the converter is acquired such that the controller acquires a maximum voltage limit value using the required maximum voltage of the first motor and the required maximum voltage of the second motor, acquires a minimum voltage limit value using the required minimum voltage of the first motor, the required minimum voltage of the second motor, and the voltage of the battery, and applies the corrected voltage command to a limiter, a maximum value of which is the maximum voltage limit value and a minimum value of which is the minimum voltage limit value.

* * * * *